United States Patent
Gillis et al.

(10) Patent No.: US 7,017,524 B2
(45) Date of Patent: Mar. 28, 2006

(54) INTENSITY VARIATION DEVICE FOR TRAINING ANIMALS

(75) Inventors: Greg Gillis, Escondido, CA (US); James L. Jameson, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 45 days.

(21) Appl. No.: 10/750,289

(22) Filed: Dec. 31, 2003

(65) Prior Publication Data
US 2005/0145201 A1    Jul. 7, 2005

(51) Int. Cl.
*A01K 15/02*    (2006.01)

(52) U.S. Cl. ........................ 119/719; 119/720; 119/908; 340/573.3

(58) Field of Classification Search ............... 119/720, 119/719, 721, 908; 340/573; 367/139
See application file for complete search history.

(56) References Cited

U.S. PATENT DOCUMENTS

| | | | |
|---|---|---|---|
| 4,802,482 A | | 2/1989 | Gonda et al. |
| 5,054,428 A | * | 10/1991 | Farkus ........................ 119/720 |
| 5,465,687 A | | 11/1995 | Custer |
| 5,605,116 A | * | 2/1997 | Kim et al. .................... 119/720 |
| 5,666,908 A | * | 9/1997 | So ............................... 119/720 |
| 5,815,077 A | * | 9/1998 | Christiansen ............. 340/573.3 |
| 6,047,664 A | | 4/2000 | Lyerly |
| 6,135,060 A | * | 10/2000 | So ............................... 119/720 |
| 6,170,439 B1 | * | 1/2001 | Duncan et al. ............. 119/720 |
| 6,311,645 B1 | * | 11/2001 | Brown ........................ 119/712 |
| 6,360,697 B1 | * | 3/2002 | Williams ..................... 119/720 |
| 6,474,269 B1 | * | 11/2002 | So ............................... 119/720 |
| 6,637,376 B1 | * | 10/2003 | Lee, IV ....................... 119/719 |
| 6,748,902 B1 | * | 6/2004 | Boesch et al. .............. 119/719 |

\* cited by examiner

*Primary Examiner*—Robert P. Swiatek
(74) *Attorney, Agent, or Firm*—Pitts & Brittian, P.C.

(57) ABSTRACT

An apparatus for an animal training device including audible and electrical stimulation. A transmitting unit provides control signals to a receiving unit, which includes a receiver, a processor, and a switch connected to a transformer and electrodes. The processor provides signals of that vary the current that produces electrical pulses of varying voltage levels, which are applied at the electrodes and provide electrical stimulation of an animal for training.

30 Claims, 5 Drawing Sheets

INTENSITY VARIATION DEVICE FOR TRAINING ANIMALS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to an apparatus for varying the intensity of stimulation applied during animal training. More particularly, this invention pertains to varying the intensity of stimulation applied to an animal wearing a collar having an attached receiver. The intensity of the stimulation is controlled by varying the current to a pulse transformer.

2. Description of the Related Art

Radio controlled training collars are known for conditioning the behavior of an animal. A transmitter, commonly handheld, is controlled by a trainer. The collar is worn by an animal and includes a receiver that triggers an electrical circuit that applies electrical stimulation to the animal through electrodes in contact with the animal. To train the animal, the electrical stimulation must be sufficient to gain the animal's attention without injuring the animal. Further, some training protocols requires that the animal receive different stimulation based upon the animal's behavior.

Various methods are known for varying the stimulation applied to an animal through a training collar. For example, U.S. Pat. No. 5,666,908, titled "Animal Training Device," issued to So on Sep. 16, 1997, discloses an animal training device that applies different levels of electrical stimulation to an animal by varying a pulse width. The electrical stimulation is generated by applying a series of pulses to a switch connected to a transformer, which has its secondary windings connected to electrodes that contact the animal. The pulses have a constant voltage level at a fixed frequency; however, the pulse widths vary based on the desired stimulation to be applied. The transformer secondary voltage is directly related to the pulse width, accordingly, the electrical stimulation applied to the animal varies as the voltage varies. The lowest level of stimulation is produced with narrow pulse widths resulting in a lower voltage of electrical stimulation applied to the animal. The highest level of stimulation is produced with wide pulse widths resulting in higher voltage of electrical stimulation.

Another example is the device disclosed in U.S. Pat. No. 4,802,482, titled "Method and Apparatus for Remote Control of Animal Training Stimulus," issued to Gonda, et al., on Feb. 7, 1989. The Gonda device uses trains of pulses applied to the switch connected to the transformer. The Gonda device varies the stimulation intensity by varying the frequency of the pulses in the pulse train. The pulse train includes pulses having a fixed voltage and pulse width; however, the period between pulses is variable. The electrical stimulation applied to the animal is at a fixed voltage. The level of stimulation varies with the number of electrical stimulation signals applied to the animal per second. The lowest level of stimulation is produced by a pulse train with a low pulse frequency resulting in fewer electrical stimulation shocks per second. The highest level of stimulation is produced by a pulse train having a high pulse frequency resulting in more electrical stimulation shocks per second. The duration of the stimulation to the animal is controlled by the operator of the Gonda device.

A still another example is the device disclosed in U.S. Pat. No. 5,054,428, titled "Method and Apparatus for Remote Conditioned Cue Control of Animal Training Stimulus," issued to Farkus on Oct. 8, 1991. The Farkus device varies the stimulation intensity applied to the animal by varying the length of the pulse train applied to the switch connected to the transformer. The pulse train includes pulses having a fixed voltage and pulse width, and the pulses have a fixed frequency. The electrical stimulation applied to the animal is at a fixed voltage. The level of stimulation varies with the duration of the stimulation to the animal. The lowest level of stimulation is produced with a pulse train having a single pulse and a short duration. The highest level of stimulation is produced by a pulse train that includes approximately 64 pulses, which results in a longer duration stimulation being applied to the animal.

BRIEF SUMMARY OF THE INVENTION

According to one embodiment of the present invention, an animal training device is provided. The device includes a transmitter unit and a receiver unit, which is attached to a collar. The device provides a stimulus to an animal based on the actions of a trainer. The stimulus is either audible, such as a beep, or electrical, such as a shock applied to an external area of the animal. The electrical stimulation has variable levels determined by the current applied to a pulse transformer transformer, which is connected to electrodes.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An apparatus for an animal training device is disclosed. The device is shown generally as 10 on the drawings. The apparatus provides stimulation, either audible or electrical, to the animal to promote or discourage specific behavior of the animal.

Figure 1:
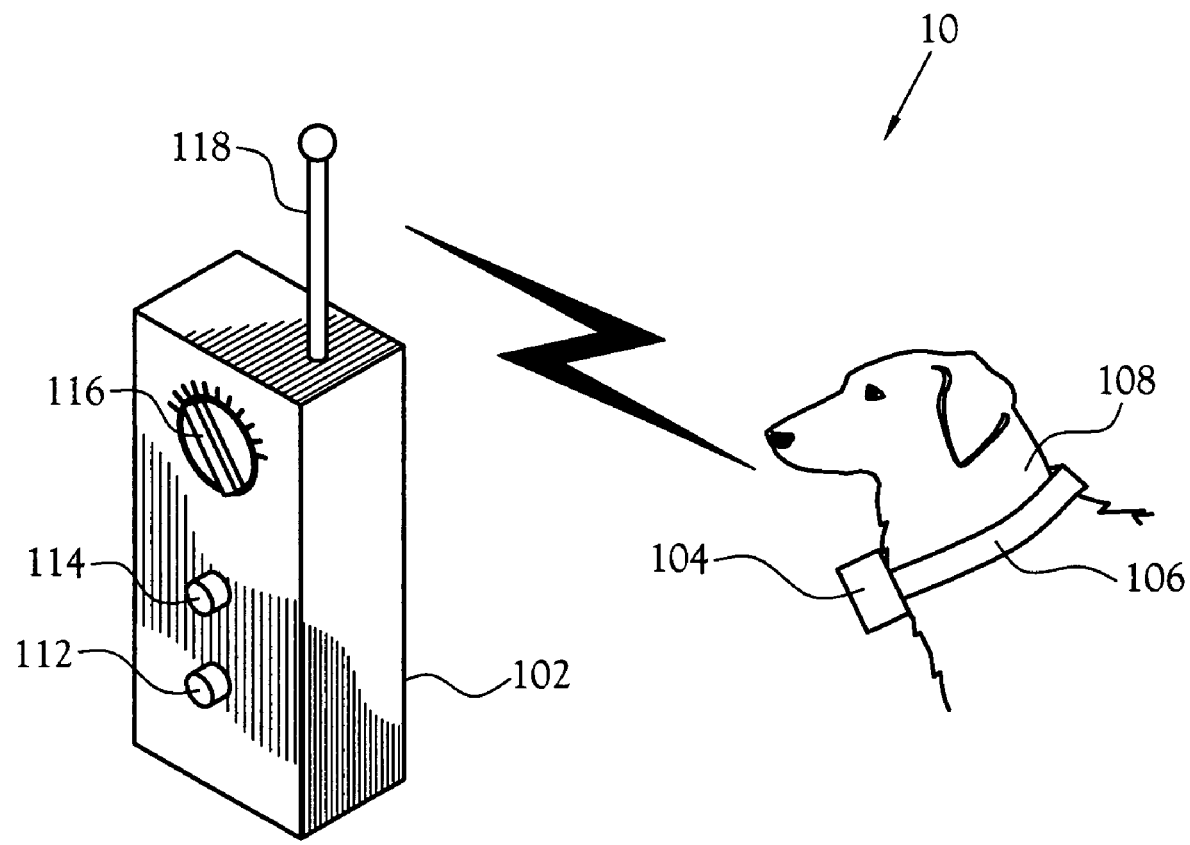
FIG. 1 is a pictorial view of a transmitter unit and a receiver unit worn by an animal.

FIG. 1 illustrates the animal training device 10, which includes a transmitter unit 102 and a receiver unit 104 attached to a collar 106 worn by an animal 108. The transmitter unit 102 includes an antenna 118. Those skilled in the art will recognize that the antenna 118 can be an external antenna as shown in FIG. 1 or an antenna internal to the housing of the transmitter unit 102 without departing from the spirit and scope of the present invention. The transmitter unit 102 includes a pushbutton switch 112 for producing a tone at the receiver unit 104. The transmitter unit 102 also includes a pushbutton switch 114 for producing a corrective stimulation at the receiver unit 104. The transmitter unit 102 also includes a selector switch, or a stimulation level switch, 116 for selecting the level of correction. Those skilled in the art will recognize that the stimulation level switch 116 can be a rotary switch or other type of selector switch without departing from the spirit and scope of the present invention.

The receiver unit 104 is attached to a collar 106 that is worn about the neck of an animal 108. Those skilled in the art will recognize that the collar 106 can be worn about other parts of the animal's body without departing from the spirit and scope of the present invention.

Figure 2:
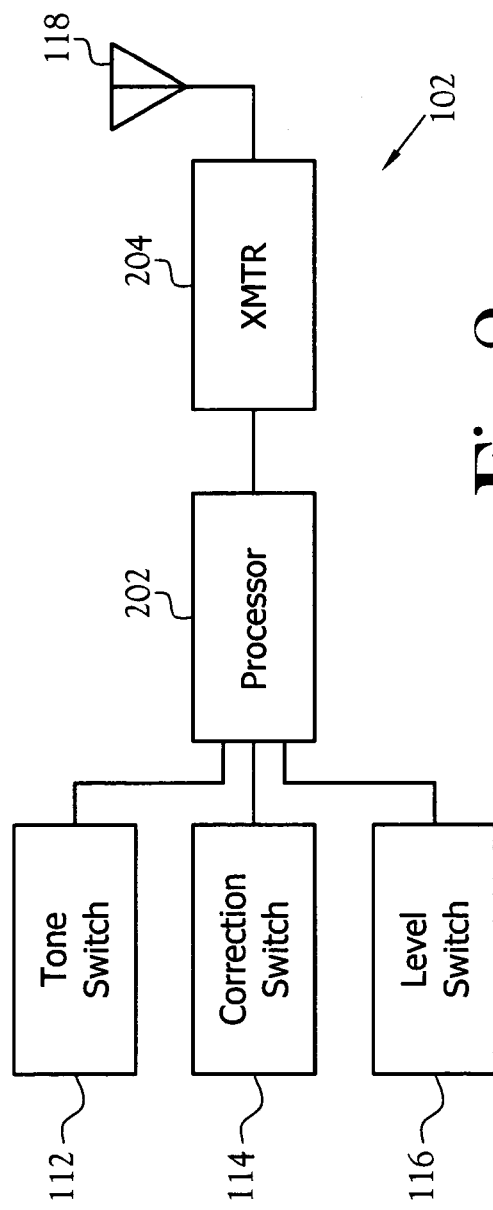
FIG. 2 is a block diagram of one embodiment of the transmitter unit.

FIG. 2 illustrates a block diagram of the transmitter unit 102. The tone switch 112, the correction switch 114, and the stimulation level switch 116 provide inputs to a processor 202. The processor 202 produces a signal that is sent through the transmitter 204 to the antenna 118.

In one embodiment, pressing either the tone switch 112 or the correction switch 114 initiates the generation of an 18 bit data stream by the processor 306. The data stream generated by the processor 306 is sent to the transmitter 204 and, ultimately, the receiver unit 104. The 18 bit data stream includes 1 bit for the pre-amble or sync, 8 bits for an identification code, 1 bit to identify that data stream is a test or identification code, 1 bit to identify dog one or dog 2, 3 bits to identify the mode or stimulation type, that is, whether the stimulation is a beep (tone) or a shock (correction), and 4 bits for the stimulation level. The transmitter unit 102 is matched to the receiver unit 104 through the use of the identification code. Unless the identification code sent by the transmitter unit 102 matches the identification code stored in the receiver unit 104, the receiver unit 104 will not respond. The mode or stimulation type code, which identifies whether the stimulation is a tone or correction, is based on which switch, the tone switch 112 or the correction switch 114, is actuated. The final 4 bits are derived from the position of the stimulation level switch 116. In one embodiment, the stimulation level switch 116 is a 10-position rotary switch, with each position representing a different level of corrective stimulation. Those skilled in the art will recognize that the stimulation level switch 116 can have as many positions as stimulation levels desired without departing from the spirit and scope of the present invention.

Figure 3:
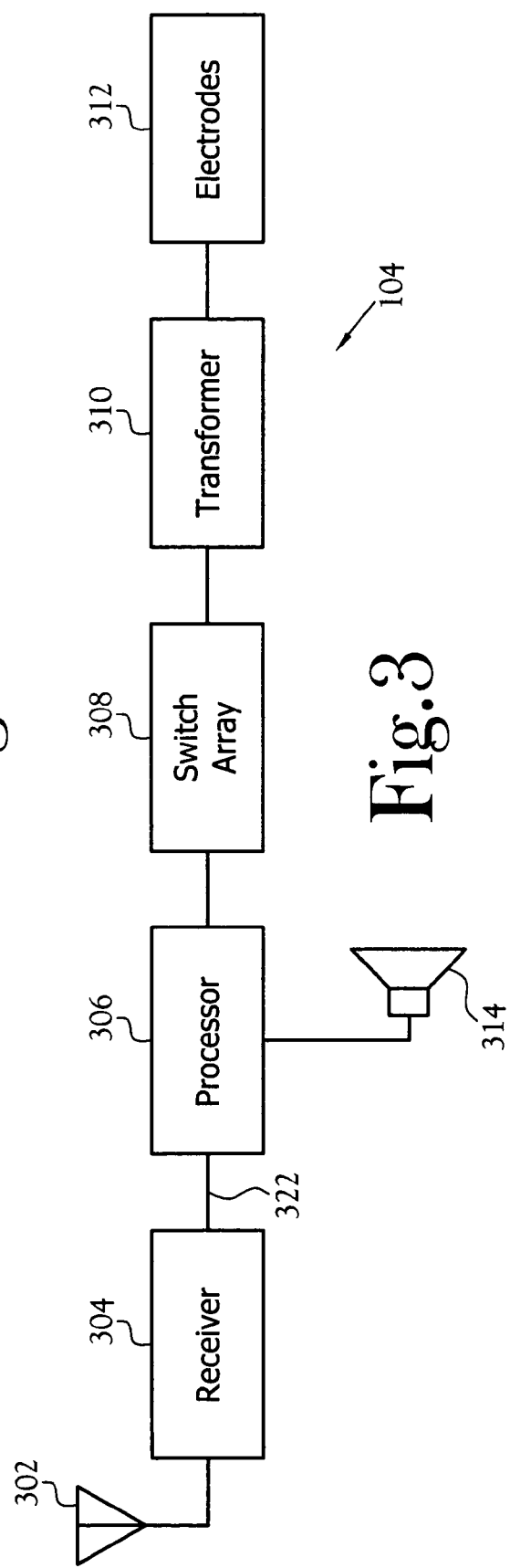
FIG. 3 is a block diagram of one embodiment of the receiver unit.

FIG. 3 illustrates a block diagram of the receiver unit 104. A receiving antenna 302 is connected to a receiver 304, which detects the signal from the transmitting unit 102 and outputs the 18 bit data stream as the received coded signal 322. The receiver 304 is connected to a processor 306, which acts upon the data stream. The processor 306 is connected to a switch array 308, which controls the transformer 310 connected to the electrodes 312. The processor 306 is also connected to a speaker 314, which provides a tone to the animal. The 18 bit data stream is detected by the receiver 304 and is passed to the processor 306 as a received signal 322. The processor decodes the received signal, or data stream, 322 and controls the switch array 308 and the speaker 314, as appropriate. In one embodiment, the speaker, or sound generating device, 314 includes an amplifier connected to a speaker or other sound producing device. The received signal 322 represents a request message from the transmitter unit 102, and the request message contains, in one embodiment, an identification code, a stimulation type code, and a stimulation level. In another embodiment, the received signal, or request message, 322 contains a test code that flags that the request message 322 is a test signal, in which case the processor 306 executes software that performs the test functions.

Figure 4:
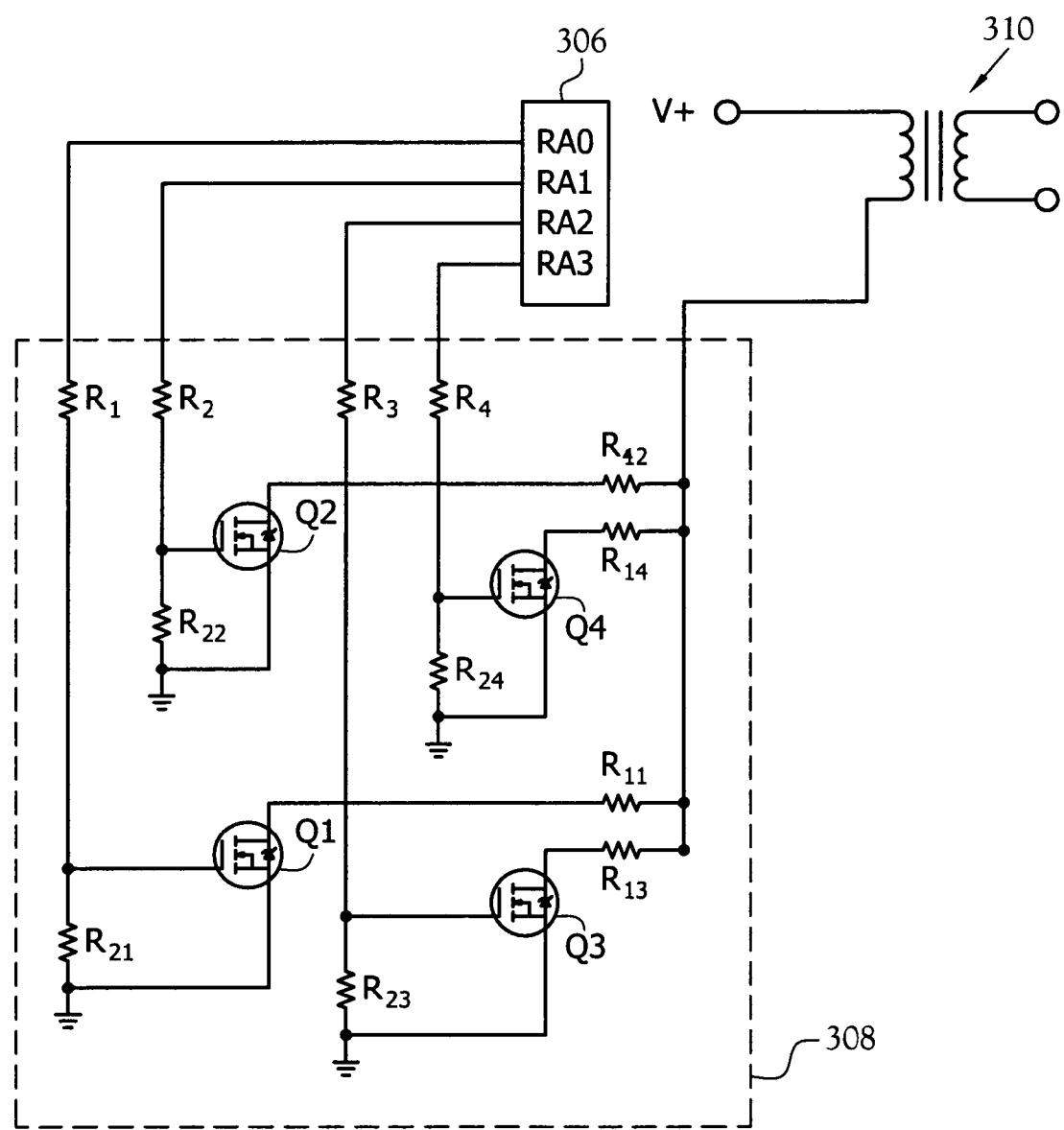
FIG. 4 is a partial schematic diagram showing one embodiment of a portion of the receiver unit.

FIG. 4 is a schematic diagram of a portion of the receiver unit 104 showing only the relationship of the connections between the processor 306, the switch array 308, and the transformer 310. The processor 306 has four output connections RA0, RA1, RA2, RA3 connected to resistors R1, R2, R3, R4 and the gates of single N-channel HEXFET power MOSFETs Q1, Q2, Q3, Q4, which is the switch array 308 illustrated in FIG. 3. The drain of the MOSFETs Q1, Q2, Q3, Q4 are connected to the primary of the transformer 310 through output resistors R11, R12, R13, R14, which have varying resistance values. The other end of the primary of the transformer 310 is connected to the power supply V+.

In one embodiment, the processor 306 is a Microchip part number PIC16CE626, which is a CMOS OTP-based 8-bit microcontroller. In one embodiment, the MOSFETs Q1, Q2, Q3, Q4 are International Rectifier part number IRF7341 dual N-channel MOSFETs. Those skilled in the art will recognize that other processors and MOSFETs can be used without departing from the scope and spirit of the present invention.

The output connections RA0, RA1, RA2, RA3 of the controller 306 are bi-directional input/output (I/O) ports. The output connections RA0, RA1, RA2, RA3 are controlled to be in one of two states: ground or Vdd, which is the positive power supply voltage.

Figure 5:
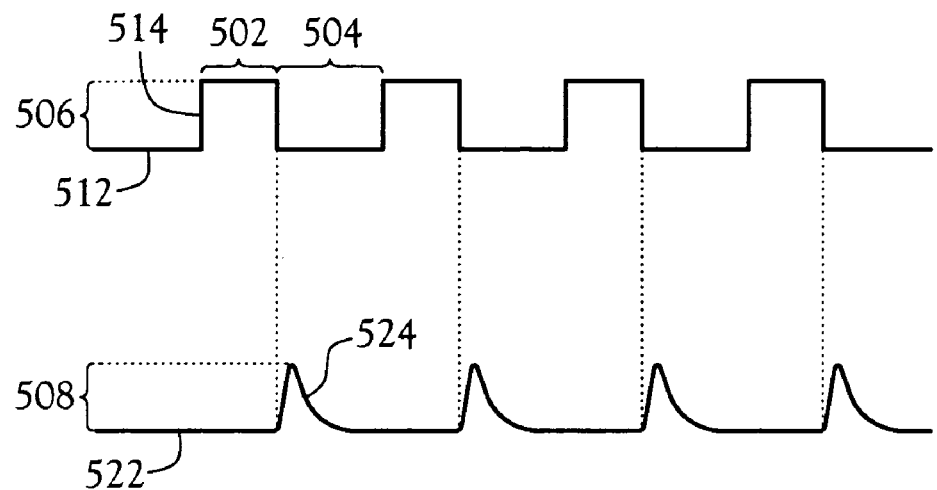
FIG. 5 is timing diagram for a low stimulation level.
Figure 6:
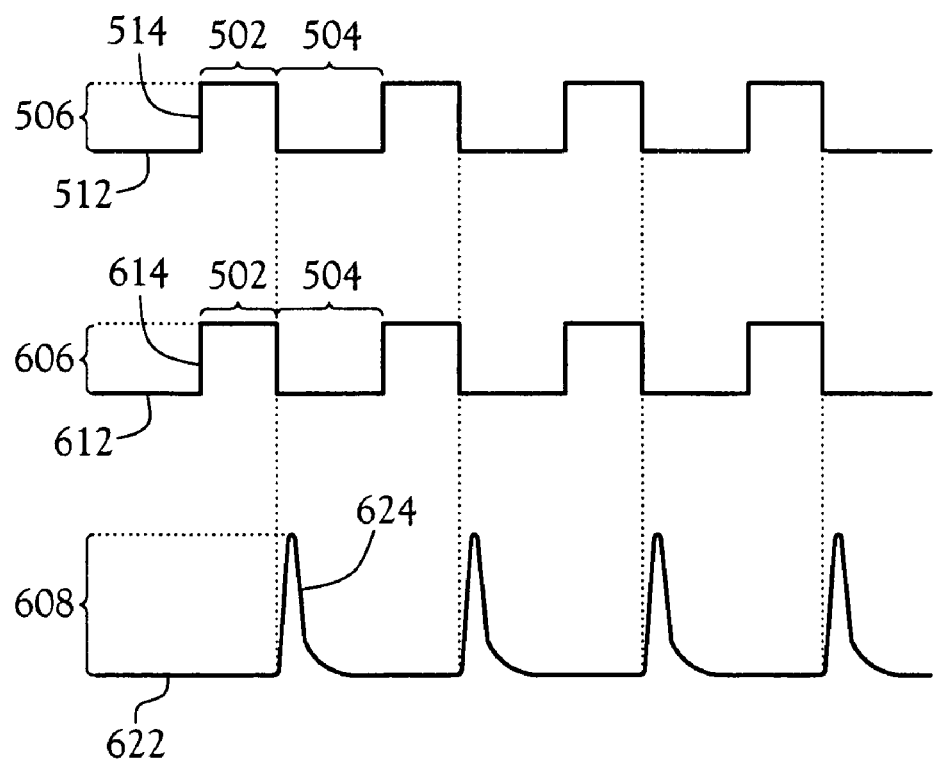
FIG. 6 is a timing diagram for a high stimulation level.

FIGS. 5 and 6 are timing diagrams illustrating the waveforms and their timing for the stimulation signals. The processor 306 produces, via the outputs RA0, RA1, RA2, RA3, an input pulse stream 512, 612 that provides the inputs to the gates of the MOSFETs Q1, Q2, Q3, Q4. The input pulse streams 512, 612 have a fixed pulse width 502, a fixed pulse frequency (illustrated by the pulse width 502 and the separation 504 between pulses 512, 612), and a fixed amplitude, or voltage level, 506, 606. The input pulse stream 512, 612 is acted upon by the switch array 308 and transformer 310 to produce an output pulse stream 522, 622 having a fixed period 502 plus 504 or frequency. The amplitude, or voltage level, 508, 608 of the output pulse stream 522, 622 varies in relation to the selected stimulation level.

The four output connections RA0, RA1, RA2, RA3 each output a pulse stream with each pulse having a constant width 502, frequency, and amplitude 506, 606. Each output connection RA0, RA1, RA2, RA3 is connected to a resistor R1, R2, R3, R4, which is respectively connected to a MOSFET Q1, Q2, Q3, Q4. The outputs of the MOSFETs Q1, Q2, Q3, Q4 are each connected, through a resistor R11, R12, R13, R14 to the pulse transformer 310. As each MOSFET Q1, Q2, Q3, Q4 is turned on by having a pulse applied 514, 614, the MOSFET output resistor R11, R12, R13, R14 limits the current that can flow through the pulse transformer 310. Each of the output resistors R11, R12, R13, R14 has a different resistance value. In one embodiment the resistors R11, R12, R13, R14 are 2.7 ohms, 6.8 ohms, 15 ohms, and 27 ohms, respectively. Table 1 shows the output voltage for these resistance values as the MOSFETs Q1, Q2, Q3, Q4 are switched on singly and in combination. The "X" in the table indicates that the MOSFET Q1, Q2, Q3, Q4 having that output resistance value is switched on, generating the voltage listed in the first column at the output of the pulse transformer 310. Each of the ten voltage levels listed corresponds to one of the positions of the 10 position stimulation level switch 116.

TABLE 1

| Output Voltage 508, 608 | | | | |
|---|---|---|---|---|
| 425 V | X | | | |
| 810 V | | X | | |
| 1250 V | X | X | | |
| 1700 V | | | X | |
| 2100 V | X | | X | |
| 2400 V | | X | X | |
| 2750 V | X | X | X | |
| 3750 V | | | | X |
| 4500 V | | | X | X |
| 5200 V | X | X | X | X |
| Output Resistance: R11 to R14 | 27 Ω | 15 Ω | 6.8 Ω | 2.7 Ω |

With respect to FIG. 5, input signal 512 is the waveform for a low stimulation level signal from one of the outputs RA0, RA1, RA2, RA3 applied to the associated input resistor R1, R2, R3, R4 and entering the gate of the associated MOSFET Q1, Q2, Q3, Q4. The input signal 512 is a square wave signal with pulses 514 that have a fixed amplitude, or voltage level, 506, a fixed width 502, and a fixed period 504 between pulses.

The output signal 522 is the waveform of the signal produced at the output of the transformer 310 corresponding to the input signal 512. The secondary of the transformer 310 produces, or generates, an output signal 514, which is a pulse stream that corresponds to the input signal 512. When the input signal 512 transitions from the pulse 514 to the period 504 between pulses, an output pulse 524 is generated, and the output pulse 524 has a voltage level 508 corresponding to the current flowing through the primary of the pulse transformer 310 from the pulse 514.

With respect to FIG. 6, input signal 512 is the waveform for a stimulation level signal from one of the outputs RA0, RA1, RA2, RA3 applied to the associated input resistor R1, R2, R3, R4 and entering the gate of the associated MOSFET Q1, Q2, Q3, Q4 and the input signal 612 is the waveform for a stimulation level signal from another one of the outputs RA0, RA1, RA2, RA3 applied to the associated input resistor R1, R2, R3, R4 and entering the gate of the associated MOSFET Q1, Q2, Q3, Q4. As in FIG. 5, the output signal 522 is the waveform of the signal produced at the output of the transformer 310 corresponding to the input signal 512. However, the amplitude of the output pulses 624 is increased over the amplitude of the output pulses 524 of FIG. 5 because the current flowing through the pulse transformer 310 for the combined two preceding pulses 514, 614 is greater than that illustrated in FIG. 5. Accordingly, as illustrated in FIGS. 5 and 6 and in Table 1, the output signal 522, 622 voltage level 508, 608 is related to the number of input signal pulses 514, 614 that cause the associated MOSFETs Q1, Q2, Q3, Q4 to switch on and apply current to the primary of the pulse transformer 3101.

The input signals 512, 612 are controlled by the processor 306, which includes software for forming the data streams at the outputs RA0, RA1, RA2, RA3. The processor 306 includes software and routines for decoding the signal 322 received from the transmitting unit 102. Included in the coded signal 322 is a stimulation level code, which is used by the processor 306 to determine the setting of the outputs RA0, RA1, RA2, RA3. The outputs RA0, RA1, RA2, RA3 are controlled by the processor 306 to produce the input signal 512, 612 by alternating the state of the outputs RA0, RA1, RA2, RA3 between the pulse 514, 614 on and off states, with the on state being held for a period equal to the pulse width time 502 and the off state being held for a period equal to the period 504 between pulses 514, 614. The number of the outputs RA0, RA1, RA2, RA3 which produce the input signals 512, 612 determines the output signal 522, 622 voltage level 508, 608.

Figure 7:
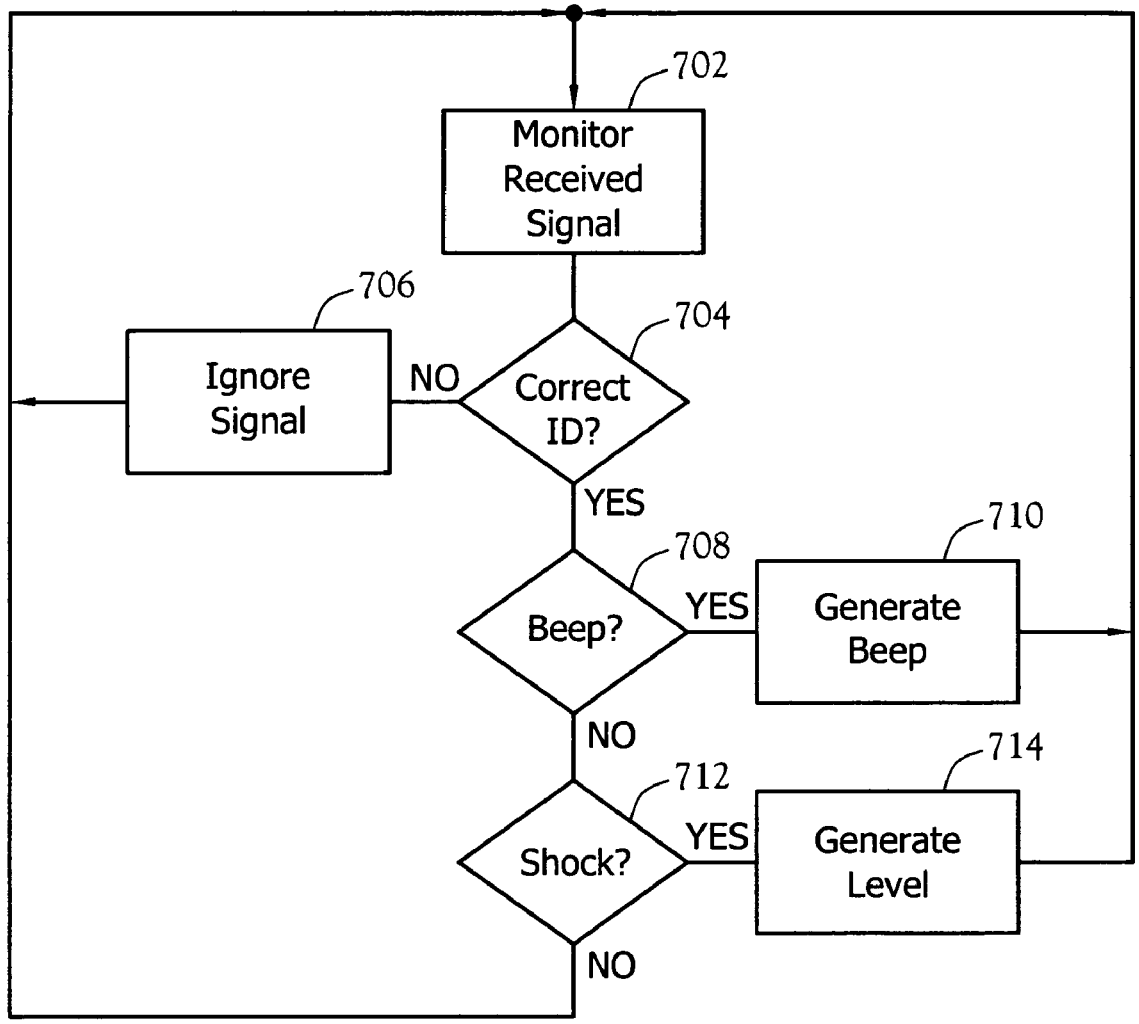
FIG. 7 is a flow diagram of one embodiment of the processor functions.

FIG. 7 illustrates the various functions performed by one embodiment of the processor 306. The signals 322 from the receiver 304 are monitored 702. When a signal 322 is received, the signal 322 is checked to verify whether it contains a correct identification (ID) code 704. If the ID code matches that stored in the processor 306, the monitored signal 322 is then checked to see if the stimulation is a beep 708. If the ID code does not match, the signal 322 is ignored 706 and the processor 306 monitors the output of the receiver 304 for another signal 322. If the signal 322 indicates that a beep is desired, the processor 306 generates a beep 710, which operates the speaker 314. Generating the beep 710 is accomplished by generating a control signal that is routed to an output of the processor 306 that is connected to a sound generating device 314.

If a beep is not desired, the monitored signal 322 is then checked to see if the stimulation is a shock 712. If the signal 322 does not indicate a shock is desired, the processor 306 loops back to monitor the output of the receiver 306. If a shock is desired, the signal 322 is decoded to generate the stimulation level 714. The processor 306 then generates stimulation level 714 by generating one or more pulse streams that are applied to the appropriate output connections RA0, RA1, RA2, RA3 of the controller 306. The one or more pulse streams cause the MOSFETs Q1, Q2, Q3, Q4 to switch on, as appropriate, and cause a current to flow through the pulse transformer 310 such that the output pulse intensity corresponds to the selected stimulation level. The combination of MOSFETs Q1, Q2, Q3, Q4 switched on by the processor 306 determines the output pulse intensity.

The length of the signal 322, which determines the stimulation period, is controlled by the operator operating the correction switch 114 and the processor 306. In one embodiment, the processor 306 includes a routine for limiting the duration of the signal 322. In one embodiment, this duration is a maximum of 8 seconds for all stimulation levels. In another embodiment, the operator can select a shorter stimulation period, or length of the signal 322, by releasing the correction switch 114 before the maximum duration time has been reached. For example, if the operator desires a one second stimulation, the operator depresses the correction switch 114 for a one second period and then releases the switch 114, which terminates the signal 322.

The processor 306, in other embodiments, includes a routine for performing the function of verifying the validity of the received signal 322. As described above, in one embodiment the transmitter unit 102 generates an 18 bit data stream. In another embodiment, the processor 306 verifies that the received signal 322 contains exactly 18 bits of data.

In one embodiment, each of the functions identified in FIG. 7 are performed by one or more software routines run by the processor 306. In another embodiment, one or more of the functions identified in FIG. 7 are performed by hardware and the remainder of the functions are performed by one or more software routines run by the processor 306.

The processor 306 includes a memory medium that stores software, or routines, that the processor 306 executes. These routines can be discrete units of code or interrelated among themselves. Those skilled in the art will recognize that the various functions can be implemented as individual routines, or code snippets, or in various groupings without departing from the spirit and scope of the present invention. As used herein, software and routines are synonymous. However, in general, a routine refers to code that performs a specified function, whereas software is a more general term that may include more than one routine or perform more than one function.

As used herein, the processor 306 should be broadly construed to mean any computer or component thereof that executes software. The processor 306 includes a memory medium that stores software, a processing unit that executes the software, and input/output (I/O) units for communicating with external devices. Those skilled in the art will recognize that the memory medium associated with the processor 306 can be either internal or external to the processing unit of the processor without departing from the scope and spirit of the present invention.

The function of receiving the coded signal 322 is performed by the receiver 304. The function of decoding the coded signal 322 is performed by the processor 306. The function of producing the electrical stimulation is performed, in one embodiment, by the processor 306 outputting at least one pulse stream 512, 612 to a switch array 308, which produces a current through the pulse transformer 310 that is related to the requested stimulation level. The function of producing a beep is performed by the processor 306 and the speaker 314.

From the foregoing description, it will be recognized by those skilled in the art that an apparatus for an animal training device is provided. The apparatus uses a plurality of pulse streams to control the current through a pulse transformer which sets the electrical stimulation applied to an animal for training. Also, the apparatus uses a processor to decode the signal from the transmitting unit and to control the stimulation type and level.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, we claim:

1. An apparatus for training an animal in which an audible and a variable level electrical stimulation is applied to the animal, said apparatus comprising:
    a transmitting unit sending a coded signal having an identification code, a stimulation type code, and a stimulation level code, said stimulation type code including a beep code and a shock code; and
    a receiver unit including
    a receiver responsive to said coded signal from said transmitting unit;
    a processor for decoding said coded signal;
    a speaker producing a beep in response to said beep code, said speaker controlled by said processor;
    a switch array controlled by said processor in response to said shock code, said processor controlling a plurality of pulse streams applied to said switch array, a number of said plurality of pulse streams related to a value of said stimulation level code;
    a transformer electrically connected to said switch array, said transformer producing an output pulse having a pulse voltage related to said number of said plurality of pulse streams applied to said switch array; and
    at least one electrode electrically connected to said transformer and located proximal the animal;
    whereby said animal is stimulated by said electrode when said electrode is energized by said transformer.

2. The apparatus of claim 1 wherein each of said plurality of pulse streams has a fixed pulse width, a fixed pulse frequency, and a fixed amplitude.

3. The apparatus of claim 1 wherein said processor has a plurality of output connections that connect to a plurality of switches forming said switch array, each of said plurality of switches forcing a specified current through said transformer.

4. The apparatus of claim 1 wherein said processor monitors said receiver for said coded signal, verifies said identification code, determines whether a beep is to be generated, determines whether a shock is to be generated, and generates said plurality of pulse streams.

5. The apparatus of claim 1 wherein said transmitting unit includes a beep switch, a shock switch, and a stimulation level switch.

6. An apparatus for training an animal in which a variable level electrical stimulation is applied to the animal, said apparatus comprising:
    a processor that monitors for a coded signal, verifies an identification code in said coded signal, determines whether an electrical stimulation is to be generated, and generates a plurality of pulse streams;
    a switch array controlled by said processor, said processor controlling a number of said plurality of pulse streams applied to said switch array;
    a transformer electrically connected to said switch array, said transformer producing an output pulse having a pulse voltage related to number of said plurality of pulse streams applied to said switch array; and
    at least one electrode electrically connected to said transformer and located proximal the animal;
    whereby said animal is stimulated by said electrode when said electrode is energized by said transformer.

7. The apparatus of claim 6 wherein said processor determines whether a beep is to be generated and further including a speaker producing a beep, said speaker controlled by said processor.

8. An apparatus for training an animal in which a variable level electrical stimulation is applied to the animal, said apparatus comprising:
    a processor that monitors a receiver for a coded signal, verifies an identification code in said coded signal, determines whether an electrical stimulation is to be generated, and generates a plurality of pulse streams; and
    a means for producing an electrical stimulation based on an output of said processor.

9. The apparatus of claim 8 wherein said means for producing said electrical stimulation includes varying a current flowing through a transformer.

10. The apparatus of claim 8 wherein said processor determines whether a beep is to be generated and further including a speaker producing a beep and further including a means for producing a beep.

11. An apparatus for training an animal in which a variable level electrical stimulation is applied to the animal, said apparatus comprising:
    a means for receiving a coded signal;

a means for decoding said coded signal; and a means for producing an electrical stimulation based on said coded signal.

12. The apparatus of claim 11 wherein said means for producing said electrical stimulation includes varying a current flowing through a transformer.

13. The apparatus of claim 11 further including a means for producing a beep.

14. In an apparatus for training an animal in which a variable level electrical stimulation is applied to the animal, a memory medium comprising software programmed to provide for controlling the stimulation applied to the animal by a process comprising:
   a) receiving an electronic signal representing a request message to stimulate the animal, said request message including an identification code, and a stimulation level code;
   b) determining whether an electrical stimulation is to be generated to stimulate the animal;
   c) generating a plurality of pulse streams; and
   d) outputting said plurality of pulse streams to a switch array that produces a signal having a current corresponding to said stimulation level code.

15. The apparatus of claim 14 wherein said process embodied in said memory medium further includes verifying a coded signal from said identification code.

16. The apparatus of claim 14 wherein said process embodied in said memory medium further includes:
   e) determining whether a beep is to be generated to stimulate the animal; and
   f) generating a control signal for operating a sound generating device.

17. A method for training an animal in which an audible and a variable level electrical stimulation is applied to the animal, said method comprising:
   a) monitoring for a coded signal representing a request message to stimulate the animal, said coded signal including an identification code and a stimulation level code;
   b) determining whether an electrical stimulation is requested;
   c) producing said electrical stimulation if requested, said electrical stimulation based on a current level corresponding to said stimulation level code, said step of producing said electrical stimulation further including a step of outputting a plurality of pulse streams to a switch array that produces said current level.

18. The method of claim 17 further including verifying said coded signal from said identification code.

19. The method of claim 17 further including the steps of:
   d) determining whether an audible stimulation is requested; and
   e) producing said audible stimulation if requested.

20. The method of claim 17 wherein said step of producing said electrical stimulation includes:
   c1) determining said current level corresponding to said stimulation level code;
   c2) generating at least one input pulse stream having a fixed pulse width, a fixed frequency, and a fixed pulse voltage;
   c3) applying at least one input pulse stream to a switch array to produce said current level in a pulse transformer; and
   c4) producing a stimulation pulse stream from said at least one input pulse stream.

21. A method for training an animal in which a variable level electrical stimulation is applied to the animal, said method comprising:
   a) monitoring for a coded signal representing a request message to stimulate the animal, said coded signal including an identification code and a stimulation level code;
   b) determining whether an electrical stimulation is requested; and
   c) if said electrical stimulation is requested:
   c1) determining a number of pulse streams to be applied to a switch array to produce a current corresponding to said stimulation level code;
   c2) generating said number of pulse streams having a fixed pulse width, a fixed frequency, and a fixed pulse voltage;
   c3) generating a current from said number of pulse streams;
   c4) generating an output pulse stream from said current; and
   c5) making said output pulse stream available to the animal.

22. The method of claim 21 further including the steps of:
   d) determining whether an audible stimulation is requested; and
   e) producing said audible stimulation if requested; and 23. The method of claim 21 further including a step of verifying said coded signal from said identification code.

24. The method of claim 21 wherein said coded signal includes a stimulation type code.

25. A method for training an animal in which a variable level electrical stimulation is applied to the animal, said method comprising:
   a) monitoring a receiver for a coded signal representing a request message to stimulate the animal, said coded signal including an identification code and a stimulation level code; and
   b) if an electrical stimulation is requested by said coded signal:
   b1) determining a current corresponding to said stimulation level code;
   b2) generating said current from a switch array receiving at least one input pulse stream, said current being independent of a pulse width, a frequency, and a pulse voltage of each one of said at least one input pulse stream;
   b3) applying said current to a transformer to generate an output pulse stream; and
   b4) making said output pulse stream available to the animal.

26. The method of claim 25 further including the step of:
   c) controlling an audible device if an audible stimulation is requested by said coded signal.

27. The method of claim 25 wherein said coded signal includes a stimulation type code.

28. The method of claim 25 further including a step of verifying said coded signal from said identification code.

29. A method for training an animal in which an audible and a variable level electrical stimulation is applied to the animal, said method comprising:
   a) monitoring for a coded signal representing a request message to stimulate the animal, said coded signal including an identification code and a stimulation level code;
   b) determining whether an electrical stimulation is requested;

c) producing said electrical stimulation if requested, said electrical stimulation based on a current level corresponding to said stimulation level code;
d) determining whether an audible stimulation is requested; and
e) producing said audible stimulation if requested.

30. A method for training an animal in which an audible and a variable level electrical stimulation is applied to the animal, said method comprising:
   a) monitoring for a coded signal representing a request message to stimulate the animal, said coded signal including an identification code and a stimulation level code;
   b) determining whether an electrical stimulation is requested; and
   c) producing said electrical stimulation if requested, said electrical stimulation based on a current level corresponding to said stimulation level code, said step of producing said electrical stimulation comprising:
   c1) determining said current level corresponding to said stimulation level code;
   c2) generating at least one input pulse stream having a fixed pulse width, a fixed frequency, and a fixed pulse voltage;
   c3) applying at least one input pulse stream to a switch array to produce said current level in a pulse transformer; and
   c4) producing a stimulation pulse stream from said at least one input pulse stream.

* * * * *